(12) United States Patent
Kivi (10) Patent No.: US 10,955,286 B2
(45) Date of Patent: Mar. 23, 2021

(54) METHOD AND ARRANGEMENT IN A WEIGHING SYSTEM AND A CORRESPONDING SOFTWARE PRODUCT AND MATERIAL HANDLING MACHINE

(71) Applicant: Ponsse Oyj, Vieremä (FI)

(72) Inventor: Aleksi Kivi, Kuopio (FI)

(73) Assignee: Ponsse Oyj, Vieremä (FI)

( * ) Notice: Subject to any disclaimer, the term of this patent is extended or adjusted under 35 U.S.C. 154(b) by 935 days.

(21) Appl. No.: 14/894,942

(22) PCT Filed: May 16, 2014

(86) PCT No.: PCT/FI2014/050374
§ 371 (c)(1),
(2) Date: Nov. 30, 2015

(87) PCT Pub. No.: WO2014/195567
PCT Pub. Date: Dec. 11, 2014

(65) Prior Publication Data
US 2016/0116328 A1 Apr. 28, 2016

(30) Foreign Application Priority Data
Jun. 4, 2013 (FI) ..................... 20135620

(51) Int. Cl.
*G01G 23/01* (2006.01)
*B66C 13/16* (2006.01)
(Continued)

(52) U.S. Cl.
CPC ............. *G01G 23/01* (2013.01); *A01G 23/00* (2013.01); *B66C 1/40* (2013.01); *B66C 1/585* (2013.01);
(Continued)

(58) Field of Classification Search
USPC .................................... 702/101–102
See application file for complete search history.

(56) References Cited

U.S. PATENT DOCUMENTS 3,096,839 A * 7/1963 Van Mastrigt ........... G01G 3/04
177/147
4,025,055 A * 5/1977 Strolenberg ............. B66D 1/52
254/277
(Continued)

FOREIGN PATENT DOCUMENTS

CN 101142466 A 3/2008
CN 102494753 A 6/2012
(Continued)

OTHER PUBLICATIONS

MSI9000 Spread Spectrum RF Operator's Manual; Measurement Systems International; 2012 Rice Lake Weighing Systems.*
(Continued)

*Primary Examiner* — Catherine T. Rastovski
*Assistant Examiner* — Leonard S Liang
(74) *Attorney, Agent, or Firm* — Beem Patent Law Firm (57) ABSTRACT

The invention relates to a method in a weighing system, in which method the mass of the bundle is weighed and recorded during both loading % and unloading $m_{i\_p}$ of the bundle, during loading, the total loading mass $m_{K\_kok\_j}$ is calculated from the mass $m_{i\_c}$ of one or more bundles weighed during loading and corrected using a correction factor $C_j$, the total unloading mass $m_{p\_kok\_j}$ is calculated from the mass $m_{i\_p}$ of one or more bundles weighed during unloading, with the aid of the said total loading mass $m_{K\_COk\_j}$ and total unloading mass $m_{p\_kok\_j}$, a new corrected value Cj+1 is calculated for the correction factor $C_j$ in order to adjust the weighing for the loading of the next load $K_{j+1}$.

(Continued)

The invention also relates to a corresponding software product, an arrangement, and a material-handling machine.

14 Claims, 4 Drawing Sheets

(51) Int. Cl.
| | |
|---|---|
| *G01G 19/08* | (2006.01) |
| *B66C 1/58* | (2006.01) |
| *B66C 1/40* | (2006.01) |
| *A01G 23/00* | (2006.01) |
| *G01G 23/00* | (2006.01) |
| *B66C 23/18* | (2006.01) |

(52) U.S. Cl.
CPC ........... *B66C 13/16* (2013.01); *G01G 19/083* (2013.01); *B66C 23/18* (2013.01)

(56) References Cited

U.S. PATENT DOCUMENTS

| | | | | |
|---|---|---|---|---|
| 4,516,116 | A * | 5/1985 | White | B66C 23/905 |
| | | | | 340/665 |
| 4,520,443 | A * | 5/1985 | Yuki | B66F 9/24 |
| | | | | 414/273 |
| 4,677,579 | A * | 6/1987 | Radomilovich | E02F 9/26 |
| | | | | 177/147 |
| 4,703,815 | A * | 11/1987 | Hirano | G01G 23/01 |
| | | | | 177/164 |
| 4,809,794 | A * | 3/1989 | Blair | E02F 3/30 |
| | | | | 177/139 |
| 4,913,551 | A * | 4/1990 | Davis | G01B 11/00 |
| | | | | 356/2 |
| 4,981,186 | A * | 1/1991 | Shankle | G01G 19/10 |
| | | | | 177/1 |
| 5,058,422 | A * | 10/1991 | Shimauchi | G01G 23/012 |
| | | | | 177/25.11 |
| 5,070,953 | A * | 12/1991 | Kyrtsos | E02F 9/264 |
| | | | | 177/25.14 |
| 5,072,798 | A * | 12/1991 | Franklin | G01G 19/18 |
| | | | | 177/147 |
| 5,160,055 | A * | 11/1992 | Gray | B66C 23/90 |
| | | | | 212/278 |
| 5,178,227 | A * | 1/1993 | Kvisgaard | G01G 11/04 |
| | | | | 177/145 |
| 5,245,137 | A * | 9/1993 | Bowman | B65F 3/04 |
| | | | | 177/1 |
| 5,270,494 | A * | 12/1993 | Davis | G01G 19/00 |
| | | | | 177/25.14 |
| 5,509,293 | A * | 4/1996 | Karumanchi | G01G 19/10 |
| | | | | 177/139 |
| 5,753,792 | A * | 5/1998 | Olson | G01G 19/03 |
| | | | | 177/25.18 |
| 5,837,945 | A * | 11/1998 | Cornwell | B65F 3/04 |
| | | | | 177/136 |
| 5,917,159 | A | 6/1999 | Kostiuk | |
| 6,073,496 | A | 6/2000 | Kuehn et al. | |
| 6,225,574 | B1 | 5/2001 | Chang | |
| 6,313,414 | B1 * | 11/2001 | Campbell | G01G 19/08 |
| | | | | 177/136 |
| 6,518,519 | B1 * | 2/2003 | Crane, III | E02F 9/264 |
| | | | | 177/136 |
| 6,756,547 | B2 * | 6/2004 | Lefler | B65D 90/143 |
| | | | | 177/141 |
| 7,211,745 | B1 * | 5/2007 | Brown | G01G 19/12 |
| | | | | 177/1 |
| 8,190,288 | B2 * | 5/2012 | Rohrauer | G05D 3/12 |
| | | | | 700/230 |
| 8,271,229 | B2 * | 9/2012 | Hsu | G01G 19/083 |
| | | | | 702/174 |
| 9,157,215 | B2 * | 10/2015 | Stanley | E02F 9/264 |
| 9,751,734 | B1 * | 9/2017 | Boger | B66C 1/585 |
| 2003/0034183 | A1 * | 2/2003 | Kortesmaki | B66F 9/0755 |
| | | | | 177/142 |
| 2003/0142832 | A1 * | 7/2003 | Meerkoetter | H04R 29/003 |
| | | | | 381/59 |
| 2005/0000703 | A1 * | 1/2005 | Furuno | G01G 19/08 |
| | | | | 172/2 |
| 2006/0224299 | A1 * | 10/2006 | Cochet | F02D 41/1497 |
| | | | | 701/114 |
| 2008/0005938 | A1 * | 1/2008 | Aebischer | E02F 9/264 |
| | | | | 37/413 |
| 2008/0169131 | A1 * | 7/2008 | Takeda | G01G 19/083 |
| | | | | 177/136 |
| 2008/0264141 | A1 * | 10/2008 | Kenmochi | G01G 3/1414 |
| | | | | 73/1.08 |
| 2009/0219542 | A1 * | 9/2009 | Waegli | G01K 11/3206 |
| | | | | 356/451 |
| 2010/0161185 | A1 * | 6/2010 | Marathe | E02F 3/431 |
| | | | | 701/50 |
| 2011/0062104 | A1 * | 3/2011 | Schneider | B66C 15/065 |
| | | | | 212/276 |
| 2011/0066394 | A1 * | 3/2011 | Schneider | B66C 13/16 |
| | | | | 702/101 |
| 2013/0098136 | A1 * | 4/2013 | Yao | G01G 19/02 |
| | | | | 73/1.13 |
| 2013/0292190 | A1 * | 11/2013 | Havimaki | A01G 23/00 |
| | | | | 177/1 |
| 2013/0302113 | A1 * | 11/2013 | Byzewski | G01G 19/18 |
| | | | | 414/21 |
| 2014/0060939 | A1 * | 3/2014 | Eppert | E02F 3/342 |
| | | | | 177/1 |
| 2014/0263142 | A1 * | 9/2014 | Billiot | B66D 1/50 |
| | | | | 212/272 |
| 2018/0340818 | A1 * | 11/2018 | Oliver | G01G 19/14 |

FOREIGN PATENT DOCUMENTS

| | | | | |
|---|---|---|---|---|
| CN | 105110188 A | * | 12/2015 | |
| CN | 105339292 A | | 2/2016 | |
| EP | 0124355 A2 | * | 11/1984 | ............ G01G 23/16 |
| EP | 0246363 A1 | * | 11/1987 | ........... G01G 19/083 |
| EP | 0246363 A1 | | 11/1987 | |
| EP | 0736752 A1 | * | 10/1996 | ............. E02F 3/435 |
| EP | 2306163 A1 | | 4/2011 | |
| EP | 2589938 A1 | | 5/2013 | |
| EP | 2910912 A1 | * | 8/2015 | ........... G01G 19/083 |
| EP | 3003952 B1 | | 5/2018 | |
| WO | 9409347 A1 | | 4/1994 | |
| WO | 02097381 A1 | | 12/2002 | |
| WO | 2012101325 A1 | | 8/2012 | |

OTHER PUBLICATIONS

Machine Translation for CN105110188 (Year: 2015).*
Machine Translation for EP0736752 (Year: 1996).*
Schulze NPL (https://www.markschulze.net/java/meanmed.html; "What are the mean and median filters?", Last Updated: Apr. 24, 2001) (Year: 2001).*
International Search Report dated Oct. 20, 2014, issued in International Application PCT/FI2014/050374 (4 pages).
European Search Report related to copending European application EP 14 80 7564, dated Nov. 30, 2016. Issued as European Patent EP 3003952.
Chinese Search Report related to copending Chinese application CN 2014800320224. Published as Chinese Application 105339292, dated Feb. 17, 2016.

* cited by examiner

Prior art

METHOD AND ARRANGEMENT IN A WEIGHING SYSTEM AND A CORRESPONDING SOFTWARE PRODUCT AND MATERIAL HANDLING MACHINE

This application claims benefit of priority from International Patent Application No: PCT/FI2014/050374 filed May 16, 2014, which claims benefit of Finland Patent Application No. 20135620, both of which are incorporated by reference in their entirety.

The invention relates to a method in a weighing system, in which method
- at least one bundle is lifted with a crane equipped with the weighing system, in order to form a load,
- the mass of the bundle is weighed,
- the mass of the weighed bundle is recorded,
- a reference value for the load is determined from the recorded mass,
- the weighing system is adjusted on the basis of the reference value.

The invention also relates to an arrangement in a weighing system and a corresponding software product and material-handling machine.

According to the prior art, in forestry and particularly in timber harvesting and timber purchasing volume measurement has become the established method of measurement. This can be done reliably, even automatically, for example using as such known harvesters and the measurement devices used in them. In addition, especially earlier, volume measurement has been carried out, for example, at timber-processing plants, for instance by immersion and by using a so-called frame measure or various measurement gates, such as a system based on laser measurement. However, particularly in terms of functioning logistics, it would be advantageous to have measurement performed at the earliest possible stage in the timber-procurement chain, for instance, preferably immediately during timber harvesting or the local transportation of timber.

Particularly in connection with the harvesting of energy timber that has become common in recent years, it is difficult to arrange reliable and functioning volume measurement in connection with a chipping machine harvesting the said timber grade, or some other timber-harvesting machine, as the timber material or timber grade being harvested is often of a small diameter and has a trunk shape that is such that it is in practice impossible to accurately measure its diameter or length. In addition, in the case of energy timber the most generally used form of harvesting is so-called bundle processing, instead of single-tree harvesting. This means principally that several trunks at a time are fed through the harvester head and processed by the harvester head, possibly being partly or entirely delimbed or alternatively not delimbed at all. In the future, it is also possible that the local-transportation payment, i.e. the rate or fee paid for the transportation of other than energy timber too, for example, conventional merchantable timber, such as log or fibre timber, could be mass-based, which would stress the importance of accurate weighing.

For the aforementioned reasons among others, in forest management, particularly in the purchasing of fibre and energy timber, and also stumps harvested for energy use, a change has been made to weighing the said timber grade already in the forest. In other words, a change has been made to using mass-based measurement in place of conventional volume-based measurement, as energy timber and other fractions collected in the forest have many different properties. For this purpose, most typically a special loader weigher, which weighs each bundle lifted, is fitted to the loader of a forwarder. In this connection, the term bundle refers to an individual transfer of a single or several trees/logs, for example, from next to the forwarder to the load space of the forwarder or vice versa, performed using a grapple or similar gripping element. Typically, the masses of the individual bundles are summed to obtain the total mass of the forwarder's load, and correspondingly, the masses of the loads are summed to obtain the mass of the whole harvesting area's timber accumulation by timber grades. Because generally the measurement made in this way using a loader weigher is the only weighing in the entire delivery chain, the result of the weighing must correspond with acceptable accuracy to the real mass of the harvested and transported bundles. The seller and buyer can then rely on the correctness of the weighing. The loader weigher, described above as part of the weighing system, is fitted to a loader acting as a lifting device, particularly in the case of a forwarder or timber truck. The lifting device can also be, for example, a crane, which is used to transfer any bulk or piece goods whatever, though the advantages of the solution according to the invention are emphasized in weighing systems in which the special features of the material being weighed and the loading process itself cause deviation and inaccuracy in the weighing result.

Check weighing has been developed to adjust the loader weigher and evaluate and monitor its operation or the weighing accuracy. Software, in which the acceptable accuracy can be programmed, for example, in addition to the other functions relating to the loader weigher, is stored in the central processing unit belonging to the loader weigher. In known check weighting, a special test bundle with a known mass is used, which is transferred from the load space of the loader tractor to a stack according to normal work procedures, as is done in actual loading work with the bundles normally to be loaded. The transfers are repeated and the value of each weighing is recorded. On the basis of the values given by check weighing done in this way, the loader weigher is adjusted so that the value measured/determined by the loader weigher corresponds to the mass of the test bundle that has been used in the check weighing. Adjustment is preferably carried out programmatically, in such a way that the driver enters, or at least approves the proposed correction, for example through the weighing system's central processing unit.

In existing check weighing utilizing a special test bundle with a known mass, however, there are certain defects, particularly in the case of a dynamic weighing situation. In practical tests it has been shown that the real mass of the timber may, in some cases, deviate excessively from the mass obtained using the loader weigher. For example, by adjusting the loader weigher to show exactly the mass of the test bundle using the known check-weighing method, too great a mass can be obtained as the real result of the loader weigher. There can be several reasons for this in the weighing system itself, in the material being weighed, or for example due to environmental conditions.

There is one significant difference between a test weight and actual bundles, especially energy-timber bundles. An energy-timber bundle, the weight of which corresponds essentially in order of magnitude to the check weight, is in length typically considerably longer than the test weight. Such a bundle can have a nearly arbitrary shape in its other dimensions too, which can cause variations in the precise performance of weighing in a dynamic weighing situation, where the bundle is in rotational and/or translational motion relative to one or more axes. At its longest, an energy-timber bundle can be even nearly ten metres long, comprising complete energy trees or at least long parts of trunks. Generally, the type of timber in the bundle and its mass and dimensions affect the loading event and thus the measurement result. Other factors include the environment, the driver, and the machine, such as a forwarder. In other words, what the loader weigher displays may be erroneous relative to the real mass for several different reasons.

In addition, a test weighing made with a special test weight takes, with its repetitions, an unnecessarily large amount of the actual work time and is not productive work. Thus, in practice test weighing may even be carried out only about once a week, which is not necessarily sufficient to ensure good weighing accuracy. Within a week conditions and the operation of the device may, however, change, thus increasing the risk of a weighing error. Typically, such a change can be, for example, a change in the electronics affecting the measurement of the suspended load, or particularly a change in the zero point or sensitivity of the strain gauges, which may lead to a need for recalibration or check weighing. Similarly, during a week or a day the timber grade and the operator of the weighing system and loader may change, which can add to the error. In addition, check weighing always requires a separate test weight, which must be carried along with the forwarder. However, the test weight should be relatively heavy, in other words with a mass comparable to a conventional bundle, typically about 500 kg, so that carrying it with the forwarder is not very easy, nor can it be stored or transported continuously, for example, with the forwarder in a practical work situation. The test weight can be lost or it can be damaged when being handled or its other properties can change, despite it being constructed to be as stable as possible and durable for its purpose, which further reduces the reliability of check weighing.

From the prior art, publication WO 2012/101325 A1 is also known, which discloses a method developed by the applicant for check weighing a weighing system. In this method the real bundle to be lifted is weighed randomly while loading a load, both in motion and when stationary. On the basis of the measured masses, a reference value is formed, which is compared to the values of the check weighing and to corresponding earlier reference values. On the basis of the comparison, an accuracy value is calculated, on the basis of which the weighing system is adjusted and/or the accuracy of the weighing system is ascertained.

However, a problem with such a method is that in the loading direction the lifting events are mutually very different, due to the nearly arbitrary location of the tree trunks relative to the forwarder. Corresponding, in the unloading direction, for example, the tree trunks loaded in the forwarder's load space are typically oriented regularly parallel to the longitudinal direction of the machine and unloading to the ground also takes place in such a way that the trees settle essentially parallel to each other, making the unloading event considerably more controlled than the loading event. In other words, in the loading direction there is great variation in the distance and direction relative to the forwarder of the tree trunks being lifted. In this connection, reference to tree trunks means both cut parts of the trunk of a tree, i.e. so-called logs, and whole tree trunks, depending on their length. In addition, the mass of the bundle varies significantly from single tree trunks to bundles, in which the whole grapple is full. Generally, however, grapples are more or less partly filled, due to which the mean deviation of the masses lifted is great. Due to the difficulty of picking up tree trunks, the centre of gravity of the bundle often settles outside the grapple, due to which the bundle tilts when being loaded. In addition to this, in thinning felling the loader and bundle must avoid trees left standing, leading to a significant variation in the paths of motion and speed of the loader and the general use of a rotator. In the final stage of lifting, the tree trunks of the bundle must often be arranged in the load space, making the load dense and even from the side of bunk of the load space. The factors referred to above among others combined with the non-idealities occurring in the measurement devices significantly reduce the measuring accuracy of the load weigher in the loading direction. Lift-specifically, the error deviation increases and a permanent bias often also arises in the error. In this connection, the loading direction refers to lifts of bundles, by which a tree or trees are transferred to the load space of the forwarder, and the unloading direction in turn to lifts by which a tree or trees are transferred out of the load space of the forwarder, for example, to the ground beside the forwarder.

The invention is intended to create a new type of weighing system, by means of which the precision of the weighing system is improved, in the case of loading, more simply and quickly than before. In addition, the invention is intended to create a new type of software product, by means of which the precision of the weighing system is improved. Further, the invention is intended to create a new type of arrangement for the check weighing of a weighing system, which can be implemented by means of known components and by means of which a higher weighing precision is achieved in loading than that of systems according to the prior art. The invention is also intended to create a new type of material-handling machine, by means of which accurate weighing is achieved in the loading direction too.

By means of the method according to the invention, loading-direction measurement errors can be eliminated effectively and advantageously. The method is based on the knowledge that the unloading-direction measurement information is generally very accurate. If the mass of the load measured during loading is compared to the mass measured during unloading the same load, a reference value can be calculated on the basis of these results, for example, the relative difference in the load masses. On the basis of this reference value a correction factor can be calculated, using which the loading-direction liftings should have been corrected, in order for the loading-direction load to have given the same result as in the unloading direction. Because the difference value between the methods and the correction factor can only be calculated after unloading, the correction factor will thus be available only when loading the next load. A delay of one load is, however, not a significant detriment, because when working on the same site the relative reference values deviate quite little from each other, so that the load-specifically calculated correction factors will deviate very little from each other. Because some of the loads can, however, be exceptional compared to an average load, due to exceptional liftings and their subsequent measurement errors, it is good to limit the effect of a single load on the correction factor, for example, by filtering. The correction should preferably always be made machine and/or driver-specifically, because drivers act and operate cranes in different ways and the construction and operation of machines generally differ from each other. Further, correction can be made in, as such known ways, either generally, or timber-grade-specifically, or timber and goods-grade-specifically. If necessary, the direction of motion in loading can also be taken into account.

More specifically, the intention of the method according to the invention can be achieved by means of a method in a weighing system, in which method, by using a crane equipped with the weighing system, at least one bundle is lifted in order to form a load, the mass of the bundle is weighed, and the mass of the weighed bundle is recorded. During loading, the mass of each bundle is weighed and the result of the correction factor is calculated, to form the corrected bundle mass, and the total loaded mass is calculated from the corrected mass of one or more bundles weighed during loading. In addition, the mass of the bundle is weighed in connection with unloading and the total unloaded mass is calculated from the mass of one or more bundles weighed during unloading. With the aid of the total loaded mass and the total unloaded mass a reference value is formed for the load, once the whole load has been unloaded. On the basis of the reference value of the load, a new corrected value is calculated for the correction factor, in order to adjust the weighing of the load for loading of the next load, i.e. the weighing system is adjusted on the basis of the reference value of the load. By comparing the total masses of loading and unloading an estimate is obtained of the magnitude of the error and the correction required in the loading-direction weighing. Using such a method the weighing of loading also becomes accurate, so that, for example, the transportation capacity of the forwarder can be utilized more precisely.

Among the common features that the invention has with the prior art are the lifting of at least one bundle with a crane equipped with a weighing system in order to form a load, and the weighing and recording of the mass of the bundle. In addition, reference weighing is performed with a check weight. Further, a reference value for the load is determined from the recorded mass and, on the basis of the load's reference value, the weighing system is adjusted. In the method according to the invention, the weighing result of the unloading of the load is used as a reference, in place of the previously used check weight. The invention is based on the observation that the unloading weighing result is very precise and can be used as a reference, with the aid of which the measurement of loading can be corrected. According to the invention, the weighing of loading is adjusted only after the previous loading-unloading event.

Preferably, in the method the product of mass of every bundle weighed during loading and the correction factor is calculated to give the corrected mass of the bundle. Thus, a precise corrected result is obtained for each lifting.

Preferably a reference value for the load is formed with the aid of the total loaded mass and the total unloaded mass, on the basis of which the said new corrected value is calculated for the correction factor. The reference value can also be used to estimate the accuracy of a measurement.

Preferably the loading weighing is adjusted for each load. Thus, an error in loading weighing can be eliminated as quickly as possible already after a few loads.

The mass of a single bundle of each loading can be adjusted with the aid of the correction factor. Thus the mass of each bundle, i.e. for example, the amount in the grapple, will be known precisely on average, and, if necessary, the load can be unloaded even in the middle of loading.

The correction factor calculated with the aid of the load can be used to adjust the weighing of the loading of the next load or loads. Thus the weighing of the loading of the next load will be again on average more precise and the error smaller. In some cases, it will not be possible to form a reliable reference value, in which case the most recent correction factor will be used in the loading of the next load. This can happen, for example, if the loading or unloading events differ significantly from the normal sequence.

According to another embodiment, the correction factor of the previous load can be used to correct the total loading mass of the next load. In that case, only the product of the correction factor and the total loading mass is calculated, which will reduce the number of calculations.

Filtering is preferably used in the calculation of the correction factor. The effect of a single load on the correction factor will then be smaller, which will, in turn, reduce possible noise in the correction factor.

50-90%, preferably 65-75% of the effect of a single load on the correction factor can be filtered. In other words, the effect of the said single load on the correction factor can be filtered by multiplying the reference value by the number 0.5-0.9, preferably 0.65-0.75. In stable conditions, the error will then diminish to become small already after 5-8 loads, but at the same time the noise in the correction factor will remain small.

According to one embodiment, the effect of a single load on the correction factor can be filtered, for example, by forming a new correction value by calculating the weighted mean value for the previous correction factor and from the correction factor calculated on the basis of the last load. The reaction sensitivity of the correction factor can be affected by means of the mutual ratio of the weighting factors used to calculate the mean value. For example, the weighting values can be 0.25 for the old correction value and 0.75 for the correction factor calculated on the basis of the last load. The greater the relative weighting value given to the correction factor calculated on the basis of the last load, the faster the new correction factor will conform to changes in conditions. On the other hand, a very large relative weighting factor for the correction factor of the last load can lead to noise in the correction factor, if conditions vary significantly between loads for some reason. If the weighting factor of the correction factor of the last load is divided by the weighting factor of the previous correction factor, the ratio thus obtained can be, for example, in the range 0.1-10, preferably in the range 1-3.

According to one embodiment, a sliding mean value is used in filtering. The use of a sliding mean value adjusts the filtering actively on the basis of the previous loads. The number of previous loads affecting the calculation of a new correction factor, and in some cases also their mutual weighting value, can be changed, in order to achieve the desired behaviour of the filtering. In this way, it is possible to effectively influence the efficiency of the filtering.

According to another embodiment, adaptive filtering is used in the filtering. This refers to smart filtering, which independently adjusts the parameters of the filtering on the basis of external information, for example a change in conditions. Thus, for example, in connection with a change observed in conditions, the filtering can initially be small and filtering can be increased in the case of later loads.

The correction factor is preferably calculated condition-sensitively. This refers to the correction factor being always calculated when conditions change in loading weighing. Thus it is possible to take account of errors deriving from changed weighing conditions in loading weighing. In situations in which the condition change is known, for example in a change of working area, the correction can, for example, be initialized or the adjustment of the correction can be accelerated temporarily, until the correction has been adjusted according to the prevailing environment. The correction can be accelerated, for example, by altering the filtering parameters.

Preferably, for example, when a new driver begins work for the first time with the machine in question, or after beginning the use of a new machine or measuring device, neutral initial correction values are used for calculating the correction value of the loading of the first load. The correction factor will then keep the weighing result unaltered in the case of the loading of the first load.

According to one embodiment, some other driver's factor or the mean value of the drivers in the system or a corresponding combination value is used to calculate the correction value of the loading of a driver's first load.

The intention of the software product according to the invention can be achieved by means of a software product, which uses the method according to the invention described above. The software product can easily be upgraded as a software upgrade of already existing weighing systems, making the change costs as low as possible and the upgrading event extremely user-friendly.

The intention of the arrangement according to the invention can be achieved by means of an arrangement in a weighing system, in which the crane belonging to the system is equipped with a weighing system for weighing a bundle to be lifted with the crane, and which weighing system includes a computation unit for calculating the mass of the bundle weighed by the weighing system and a memory for recording the masses. The computation unit is arranged to adjust the weighing system on the basis of the recorded bundle masses. In the arrangement, the weighing system is arranged to weigh the mass of each bundle of the load in connection with both the loading and unloading of the bundle. The computation unit is arranged to multiply the mass of each bundle weighed during loading by a correction factor to form a corrected bundle mass and to calculate the total loading mass from the corrected masses of one or more bundles weighed during loading. Further, the computation unit is arranged to calculate the total unloaded mass from the masses of one or more bundles weighed during unloading, to form a load reference value with the aid of the total loading mass and the total unloading mass, and to calculate, on the basis of the load's reference value, a corrected value for the correction factor, in order to adjust weighing of the loading for the loading of the next load.

The computation unit is preferably arranged to calculate the product of the mass of each bundle weighed during loading and the correction factor, to form the corrected mass of the load. In this way, a precise corrected result is obtained with each lifting.

The computation unit is preferably arranged to form a reference value of the load with the aid of the said total loading mass and total unloading mass, on the basis of which a corrected value for the correction factor is calculated, in order to adjust weighing of the loading in the loading of the next load. The reference value can also be used to evaluate the precision of the measurement.

The arrangement preferably includes software means, which are arranged to record the results of the loading and unloading weighings, to process the recorded data, and to perform the calculation of the reference value.

Several advantages are gained by means of the method according to the invention, compared to methods according to the prior art. Due to the feedback of the correction value, the method corrects the mean error in the loading direction, in practice with a few iteration cycles, to about the magnitude of the unloading measurement error. The only requirement for the use of the method is that the unloading direction measurement should be calibrated and accurate. The method can be implemented without extra operations by the driver. The method can also be implemented without demands on or limitations to the loading event or type of loading, so that the use of the method does not slow down working. The method according to the invention can be implemented without calibration sequences made with a weight and random lifting, which are required in methods according to the prior art. Checks made with a weight can be used for unloading-direction checks and calibration.

In the method according to the invention, the correction of the masses of the loading bundles can be completely automated, and can be completely hidden from the operator, so that the operator can use the method without knowing about the presence of the property. The method can be introduced in forwarders in the field or other machines weighing a load with only a software upgrade.

The accuracy of loading weighing is important, because more accurate weighing during loading permits more precise loading of the load, so that the mass of the load is close to the optimum. By means of the method according to the invention, the load can be loaded as closely as possible to the optimum during loading, which improves the efficiency of transportation. In practice, the optimization of the load to the maximum load is typically hindered by the fact that different types of timber, such as energy timber, commercial timber, logs, and similar have different typical densities and, on the other hand, the moisture content of the aforementioned materials can also considerably affect the real mass. It is thus difficult for even an experienced driver to estimate, for example, the mass of a load accumulating in the load space of a forwarder very accurately purely visually, without functioning weighing also acting in the loading direction.

In the following, the invention is described in detail with reference to the accompanying drawings showing some embodiments of the invention, in which.

Figure 1A:
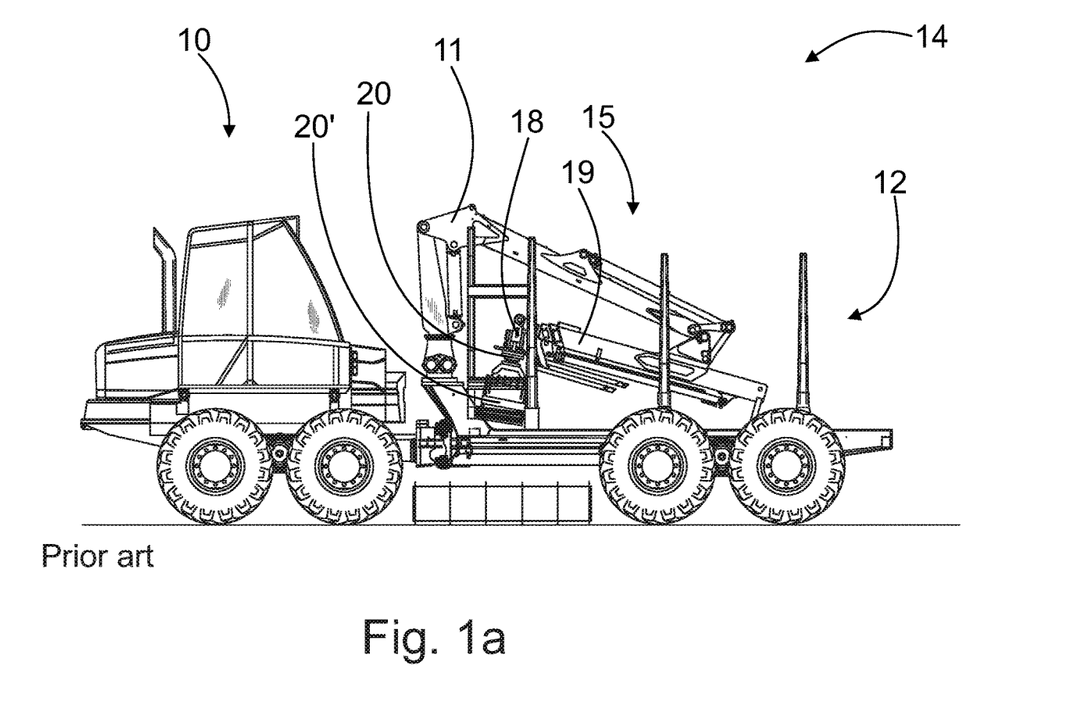
FIG. 1a shows a side view of a forwarder.
Figure 1B:
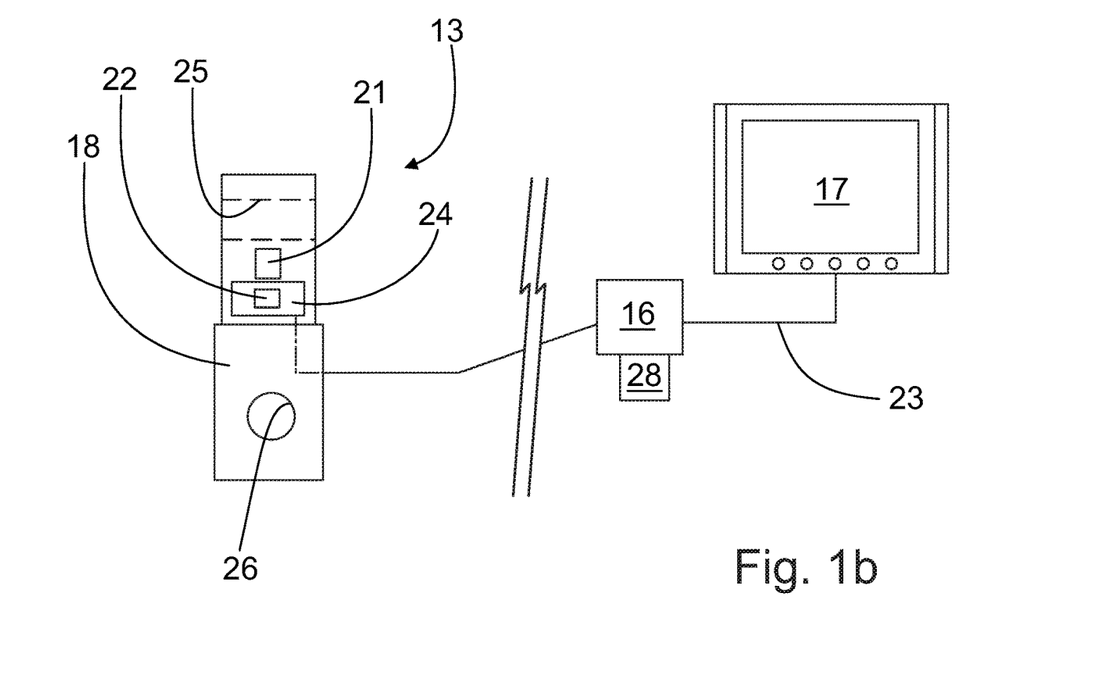
FIG. 1b shows a schematic diagram of an as such conventional loader weigher with a central processing unit separate from the loader.

FIG. 1a shows an, as such, known forwarder 10, which includes a loader 11 and a load space 12. FIG. 1b shows a schematic diagram of a loader weigher 13 with its accessories. Here, the forwarder is an example of a material-handling machine, in which there is an arrangement according to the invention. As an example of an embodiment a weighing system 14 is shown, in which the crane 15 is a loader and the weighing system includes a loader weigher 13. The computation unit 16 belonging to the totality is preferably located, for example, in the cab of the forwarder, and has in it a display device 17 for transmitting information and displaying to the operator of the weighing system (FIG. 1b). The display device and the computation unit and the other necessary data processing means can be as such known devices arranged to serve in forestry machine or other vehicle or work machine generally, or particularly arranged for a loader weigher in, for instance, a forestry machine. The computation unit has the necessary processing power to process the measurement data of the loader weigher and display it to the operator. The computation unit can also have the necessary storage capacity to record the data, but this can also be in a memory 28 separate from the computation unit.

The loader weigher is formed of a suspension bracket 18, which is attached between the loader's 11 boom 19 and the rotator 20. In the embodiment of FIG. 1a, attached to the rotator 20 is a grapple 20', which the rotator 20 rotates. The loader weigher can also be installed in other vehicles or machines, which related to material handling and in which reliable weighing is required. The detailed construction of the loader weigher and the placing of the components is the loader can vary considerably within the scope of the present invention. For example, the force and possible acceleration sensors contained in the suspension bracket and referred to in the detailed description of the embodiment could possibly also be located elsewhere than between the end of the boom and the rotator, however in such a way that the desired force and/or weight data and, for example, acceleration data can be measured.

The length of the suspension bracket is typically about 300 mm and its practical weighing range, for example, 70-2000 kg. In the suspension bracket 18 is a weight sensor 21, by means of which a bundle is primarily weighed. Functionally, the question is of a sensor reacting to force. Because the force is caused by a mass being weighed, the term weight sensor is used. The weight sensor can be based, for example, on a strain-gauge sensor, or alternatively, for instance, on a hydraulic operating device, preferably a combination of a hydraulic cylinder and a pressure sensor or transmitter. The suspension bracket also includes one or more acceleration sensors, measuring acceleration relative to one or more axes, such as in this case one two-axis acceleration sensor 22, which can be used to monitor the movements of the loader. In fact, simple loader weighers are known, which are intended to operate reliably only in static situations, in which weighers there is not the said acceleration or other feedback.

Acceleration data can also be used to adjust the loader weigher, as the movement of the bundle naturally affects the weighing result. By means of the information obtained from the acceleration sensors, the mass of the bundle in motion can be corrected. It is then possible to use the whole lifting for weighing the bundle and thus obtain better accuracy. The acceleration sensors' detection axes are arranged at right angles to each other, so that by using two sensors comprehensive information is obtained on the movement and attitude of the suspension bracket. It is naturally also possible to use an arrangement measuring acceleration relative to three axes, in which, the sensors measuring acceleration parallel to each axis can be separate or integrated to form one totality. In the computation unit there are preferably also the necessary power inputs and data-transfer connections for operating different components. In this case, there is a CAN bus 23 between the suspension bracket 18 and the computation unit 16. In a known manner, the data transfer can, if desired, also be implemented completely wirelessly. This can be an advantage when data should be transferred in difficult conditions, such as in connection with the set of booms of a forestry machine, which is easily damaged by external obstacles.

The weight sensor 21 is built into the suspension bracket 18 and can be used to measure forces in both the longitudinal and transverse directions of the suspension bracket 18. In static situations, when the forwarder is on a horizontal surface, the longitudinal direction is essentially parallel to gravity and an essentially straight tension acts on the weight sensor, assuming that the bundle has been gripped centrally relative to its centre of gravity. When the forwarder is on a sloping surface and/or with an unbalanced bundle, slanting forces, which can also be measured using the weight sensor, also act on the suspension bracket. A two-axis acceleration sensor 22 is located on an electronics card 24. At the upper end of the suspension bracket 18 is a hole 25 for a pin, by means of which the suspension bracket 18 is attached to the boom. Correspondingly, at the lower end is second hole 26 for a pin, by means of which the suspension bracket is attached to the rotator. The holes are at right angles to each other, so that it is possible for the grapple to swing in two directions. In other words, the holes are crosswise, in such a way that the upper pin permits movement parallel to the boom and the lower pin permits lateral movement. The same weight sensor can be used to measure the forces caused by an eccentric bundle. In this case, the lower hole is in the transverse direction referred to above. The foregoing describes one embodiment example of the loader weigher. However, the method itself is also suitable for other kinds of weighing system.

Figure 2:
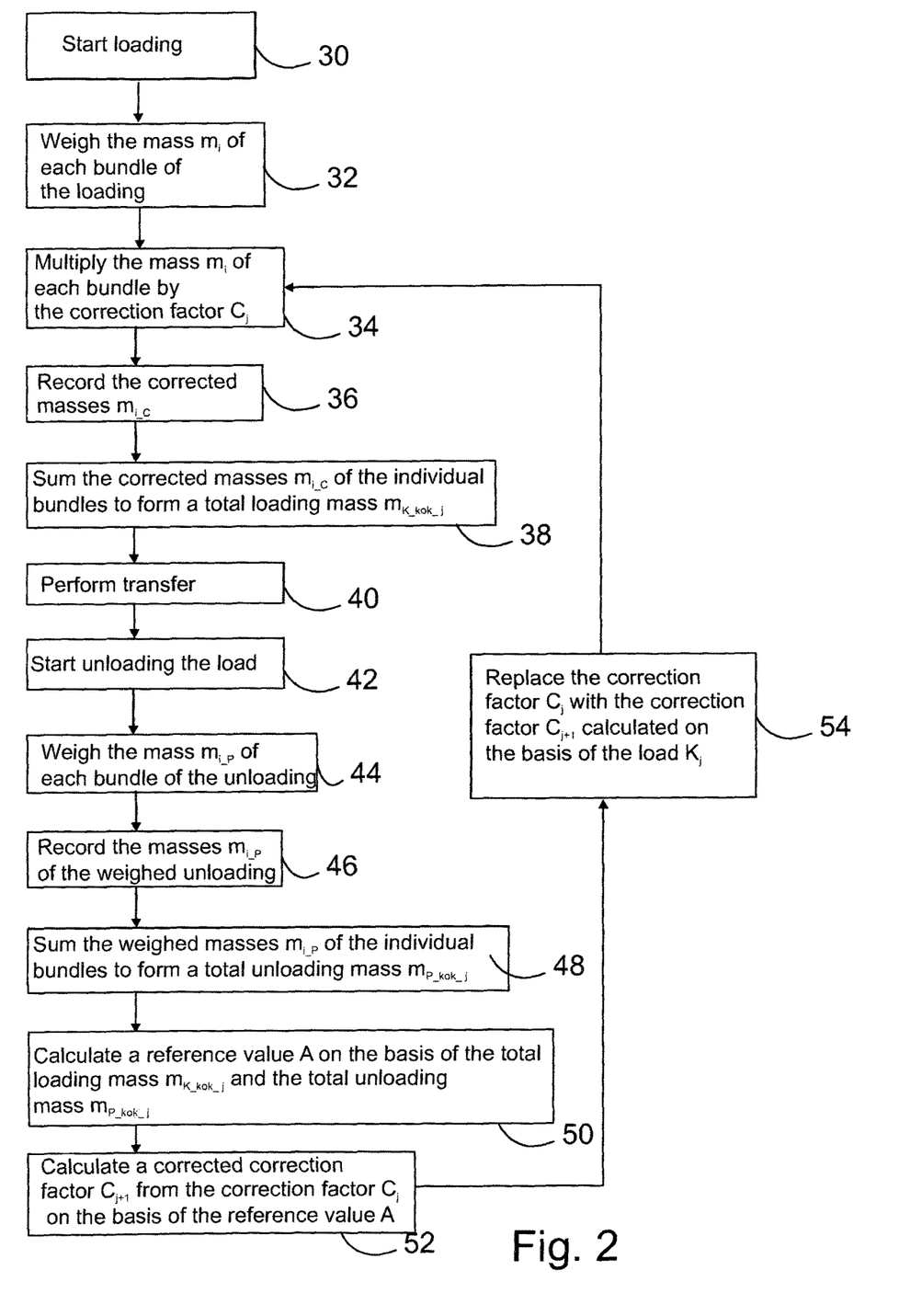
FIG. 2 shows the stages of the method according to the invention.

FIG. 2 shows schematically the stages 30-52 of the method according to the invention. The method is intended to be used for adjusting a loader weigher, in order to improve the accuracy of the weighing of loading. When still using as an example a forwarder according to FIG. 1, the method is initiated with the loading of tree trunks into the load space of the forwarder in stage 30. The operator uses the grapple to collect a single tree or generally, in the case of energy timber, several thin trees at a time, and lift the trees into the load space. In this connection, reference to a single tree means the same as using the term log. Hereinafter, the name bundle will be used for the trees that are in the grapple at one time and are loaded into the load space. The mass $m_i$ of each bundle is weighed during lifting, in stage 32. In this connection, the subindex i refers to the sequence number of the bundle. In stage 34, the product of the mass $m_i$ of each bundle and the load-specific correction factor $C_j$ is preferably calculated in connection with the weighing of the bundle, which product takes into account the error in the weighing of every bundle lifted during loading. In this connection in turn the subindex j refers to the sequence number of the load. The corrected masses $m_{i\_c}$ of the bundles multiplied by the correction factor are recorded in the memory in stage 36. Multiplication by the correction factor $C_j$ can also take place after the mass $m_i$ of the bundle has been stored in the memory. In stage 38, the corrected values $m_{i\_c}$ of the masses $m_i$ of all the bundles of the loading are summed together to give the total loading mass $m_{K\_kok\_j}$ of the load, which is generally sought to be as close as possible to the optimal maximum weight of a single load $K_j$ of each forwarder. More specifically, $m_{K\_kok\_j}$ is $m_1C_1 + m_2C_1 + m_3C_1 + \ldots + m_nC_1$. Summing preferably takes place in real time as loading progresses. In this connection, the term load refers to the total mass, consisting of one or preferably several bundles, in the load space of the forwarder.

When loading is finished, i.e. when the forwarder has be loaded as closely as possible to its optimum load, a move can be made from the loading site to the unloading site, in stage 40. Moves from one loading site to another can also be made during loading, and the number of trunks in the forwarder can even be reduced, in which case the values of the masses of the eliminated trunks are deducted from the total loading mass $m_{K\_kok\_j}$. The weighing system can distinguish between loading and unloading, for example on the basis of the use of the force and acceleration sensors and the crane and rotator, or generally by utilizing two or three data and combining them. In stage 42, after transfer unloading of the load $K_j$ is commenced, for example, to a stack. Preferably, the mass $m_{i\_p}$ of every bundle unloaded from the load $K_j$ is weighed in stage 44 and the value recorded in the memory in stage 46. Because the unloading-direction weighing is very accurate, the weighed masses of unloading are recorded as such in the memory. The Measurement Act in force in Finland forbids the manipulation in any way of the unloading weighings, even to improve accuracy. The values of all the unloading bundles $m_{i\_P}$ are summed in stage 48 to give the total unloading mass $m_{K\_kok\_j}$ of the load $K_j$, which corresponds very well to the real mass of the loaded load.

In stage 50, a reference value A, which depicts how accurate the weighing of the loading is, is formed preferably on the basis of the calculated total loading mass $m_{K\_kok\_j}$ and total unloading mass $m_{P\_kok\_j}$. The reference value A is preferably relative, i.e it can be calculated, for example, using the following equation $$A = \frac{m_{P\_kok\_j} - m_{K\_kok\_j}}{m_{P\_kok\_j}}$$

i.e. by subtracting the total loading mass $m_{K\_kok\_j}$ from the total unloading mass $m_{P\_kok\_j}$ and dividing this by the total unloading mass $m_{P\_kok\_j}$. The reference value is preferably relative, as an absolute reference value, for example, the difference between the total masses of loading and unloading, is dependent on the size of the load. If the loads remain with always the same mass an absolute reference value can be used. In stage 52, on the basis of the reference value A the value $C_{j+1}$ is calculated for the correction factor from $C_j$, which replaces the value $C_j$ of the correction factor used in connection with the loading of the load $K_j$ in stage 54.

Figure 3:
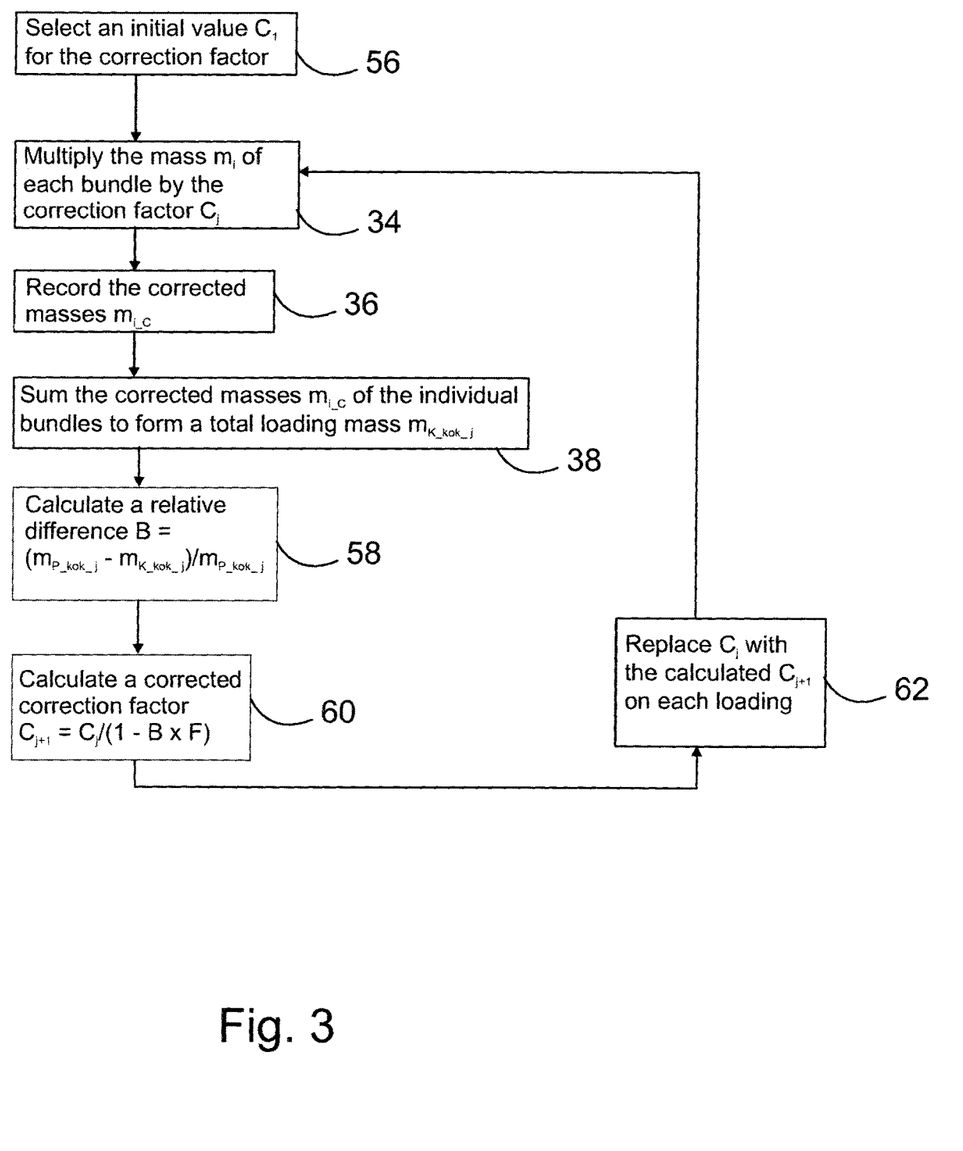
FIG. 3 shows in greater detail the stages of the method according to the invention for determining the correction factor.

FIG. 3 shows in greater detail the calculation of the correction factor, as a simplified flow diagram. In connection with the first load $K_1$, or generally when some significant condition affecting the loading has changed, an initial correction factor $C_1$ is used to correct the masses $m_i$ of the bundles of the loading. In stage 56, some initial value is chosen for the initial correction factor $C_1$, which can be, for example, a neutral number such as 1 or 0, which keeps the masses $m_i$ of the weighed bundles as they are. According to one embodiment, the initial correction factor can also be some other number, for example 0.7, if it is ascertained that the masses of the bundles weighed in loading are always larger than the masses of the bundles weighed in connection with unloading. As in FIG. 2, the initial correction factor $C_1$ is used for multiplying the masses $m_i$ of the bundles in loading the first load $K_1$, in stage 34. After this, the corrected masses $m_{i\_c}$ are stored in the memory in stage 36 and summed to form a total loading mass $m_{K\_kok\_j}$ in stage 38. After this, in stage 58 the relative difference value B is calculated with the following equation $$B = \frac{m_{P\_kok\_j} - m_{K\_kok\_j}}{m_{P\_kok\_j}}$$

In this example, the relative difference value B is used as the reference value A, which is shown in the embodiment of FIG. 2. In stage 60, using the relative difference value B, it is possible to calculate the corrected correction factor $C_{j+1}$, which is obtained from the equation $$C_{j+1} = \frac{C_j}{1 - B \times F}$$

in which F is the chosen filtering coefficient and X refers to a conventional multiplication and not a cross product. The corrected correction factor $C_{j+1}$ replaces the previous correction factor $C_j$ in stage 62. The initial correction factor $C_1$ is used to correct the loading of the bundles of the first load $K_1$. The correction factor $C_{j+1}$, corrected with the aid of the preceding load $K_j$, is used for the subsequent loads $K_{j+1}$. Thus, a corrected correction factor is calculated, which takes into account the error arising in the weighing of the loading of the previous load $K_j$. As a result, the bundles are weighed more accurately in the loading of the next load $K_{j+1}$. With the aid of the correction factor $C_j$ dependent on the reference factor A, it is possible to form an adjustment circuit for feedback to the correction factor $C_j$, which will minimize the error in weighing due to the inaccuracy of loading entirely or nearly entirely within a few loads, or even immediately after a single load.

In the method according to the invention, filtering is preferably used in the weighting of the reference value A, in order to calculate the corrected correction factor $C_{j+1}$. Filtering is intended to reduce the effect of individual loadings on the development of the correction factor. In filtering, several different filtering alternatives can be used to determine the filtering coefficient. The filtering coefficient F can be, for example, a fixed percentage, 50-90%, preferably 65-75%, by which the effect of an individual loading on the corrector factor of the next load is reduced. The use of a filtering coefficient F of less than 50% is disadvantageous, as in that case the correction of the error arising in the weighing of loading by adjusting the weighing of the loading will be slow and require several loads to remove the error to a sufficient accuracy. The use of a filtering coefficient of one hundred percent will rapidly correct the weighing error in loading, but may in turn cause noise in the correction factor. Noise will arise, if the error of an individual load deviates, for one reason or another, from the other preceding loads, in which case the error will increase. The correction factor will then change radically according to the preceding load, even though the individual load was an exception. Thus, a large amount of noise will cause an error in determining the mass of an individual load in the loading direction.

According to one embodiment, a sliding mean filter is used in the filtering of the correction factor. The correction factor can then be calculated on the basis of, for example, the previous load, after which the mean value is taken of the correction factors calculated on the basis of the ten previous loads. This mean value can be used as the correction factor of the next load.

According to one embodiment, the filter used in the method can be a smart adaptive filter, the algorithms of which adjust the parameters of the filter automatically on the basis of, for example, changes taking place in loading, measurement, or measurement accuracy. By means of such an implementation, it is possible to detect at an early stage a change in level or a trend affecting the correction factor and caused by a change in conditions, when the reaction speed of the regulator, and thus also of the error correction can be accelerated for the duration of the change in conditions.

Figure 4:
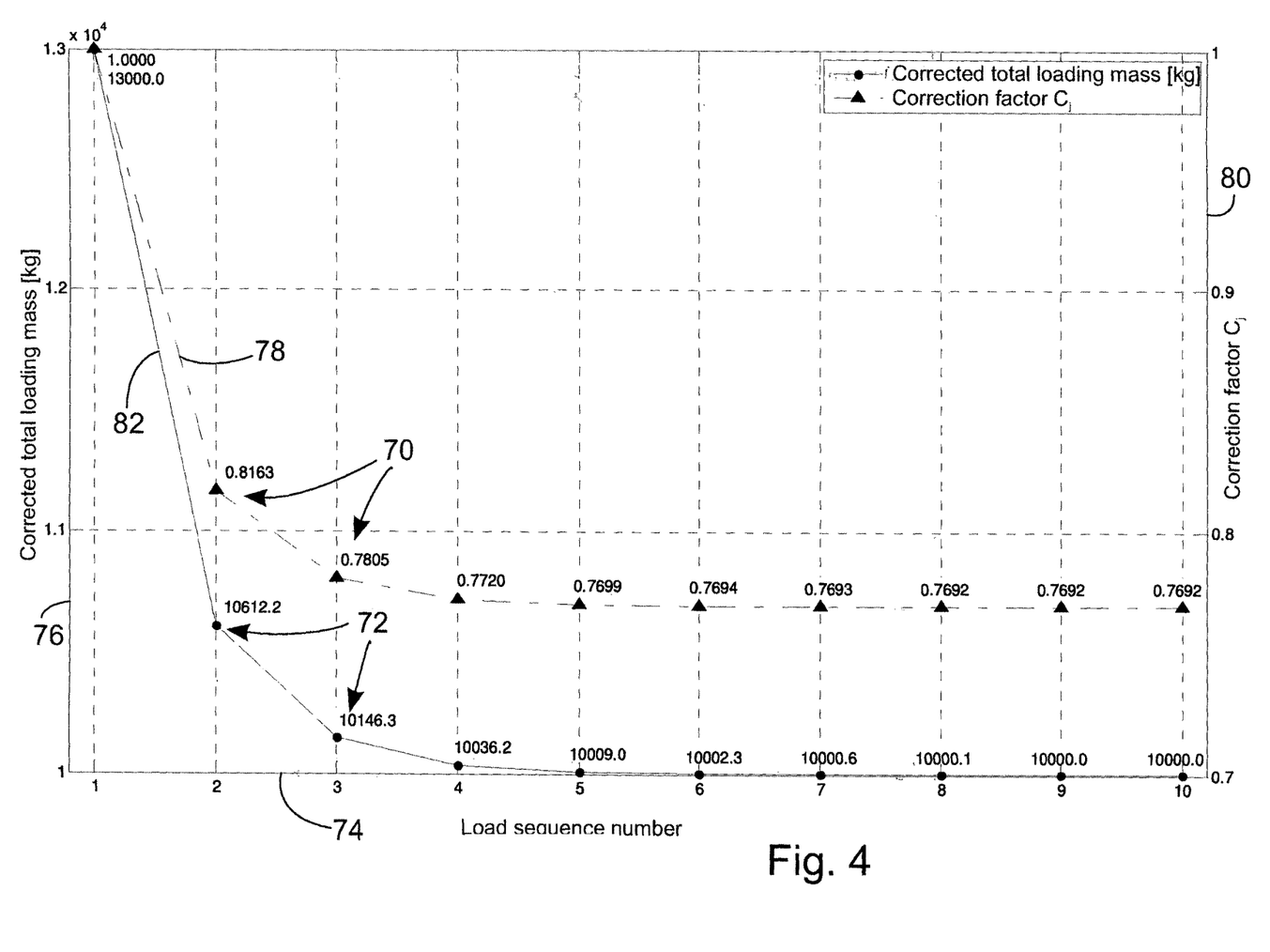
FIG. 4 shows the development of the correction factor and the corrected total loading mass of the method according to the invention in an example graph.

FIG. 4 shows an example graph of the behaviour of the mass 76 of a bundle weighed in the loading of a load and of the correction factor 80, when a load with the same real mass of 10000 kg is loaded and unloaded ten times. The sequence number of the loads is shown by the reference number 74 on the horizontal axis. In this example, 1, which is a neutral number in the multiplication of the masses of the load, is selected as the initial correction factor $C_1$. Next is shown one example of a way, in which the change in the correction factor can be filtered. 13000 kg is obtained as the total loading mass $m_{K\_kok\_j}$ of the bundles of the loading of the load $K_1$. In the graph, the total loading masses $m_{K\_kok\_j}$ of the various loads $K_j$ are marked with the reference number 72 and the values of the correction factors $C_j$ with the reference number 70. Graph 82 shows the development of the total loading masses $m_{K\_kok\_j}$ between the loads $K_j$ and graph 78 in turn the development of the correction factor $C_j$. Because the real mass of load $K_1$ is 10000 kg, 10000 kg is also obtained as the total unloading mass $m_{P\_kok}$. On the basis of this, the relative difference value B can be calculated, which in this case is (10000−13000)/10000, i.e. −0.3. From this in turn a corrected correction factor $C_2$ can be calculated for the second load $K_2$, which is 1/(1−[−0.3*0.75])=0.8163. When this is used to calculate the product of the corrected correction factor $C_2$ and the mass $m_i$ of each bundle of the following loading $K_2$, the value 13000*0.8163=10612.2 is obtained as the total loading mass $m_{K\_kok\_j}$ of the second load $K_2$. In the example graph shown in FIG. 4, the same load is loaded and unloaded 10 times. The example is calculated using a more precise resolution than the four decimals shown in FIG. 4, which leads to a change in mass taking place in loads 8 and 9, though the approximate value of the correction factor remains unchanged.

The filtering coefficient used in the previous example is 75%, so that after each load the error is reduced by 75%. Thus, the total loading mass $m_{K\_kok\_j}$ of the load rapidly approaches the total unloading mass $m_{P\_kok}$ and already after five loads achieves an error level of less than one promil. At the same time, the value of the correction factor achieves a specific reading value. Because the error diminishes by 75% after each loading, 25% of the error associated with the previous load always remains to the next load. Thus, the error never disappears completely, but diminishes to become immeasurably small. When examining real loads, the loading conditions can vary considerably, so that multiplying by the correction factor before weighing the load can vary to some extent. However, with the aid of the correction factor $C_j$, the total loading mass $m_{K\_kok\_j}$ is brought relatively close to the total unloading mass $m_{P\_kok\_j}$.

According to another embodiment, sliding mean-value filtering, differing from the filtering described in the paragraph above, is used for filtering. In this case, an individual reference value is not multiplied by the filtering coefficient, but rather a new corrected correction factor, calculated using 100-% filtering, is multiplied by a weighting factor. The unfiltered correction factor $C_j$ unfiltered, calculated on the basis of the most recent load, is calculated using the formula $C_j/(1-B)$. A new filtered correction factor $C_{j+1}$ is calculated using a mean value of the weighted correction factor, calculated on the basis of the previous correction factor and the most recent load, using the following equation (pk_previous*$C_j$+pk_unfiltered*$C_j$_unfiltered)/(pk_previous+pk_unfiltered), in which pk_previous and pk_unfiltered are weighting factors. The value 0.25 can then be used as the weighting factor pk_previous and the value 0.75 can be used as the weighting factor pk_unfiltered. The larger the relative weighting factor than is given to the correction factor calculated on the basis of the most recent load, the more rapidly the new correction factor will conform to changes in conditions. On the other hand, a very large relative weighting value of the correction factor of the last load may cause correction-factor noise, if, for some reason conditions vary significantly between loads. If the weighting factor of the correction factor of the most recent load is divided by the weighting factor of the previous correction factor, the ratio thus obtained can be, for example, in the range 0.1-10, preferably in the range 1-3.

The weighing system preferably operates condition-sensitively. This means that the weighing system takes into account changes in the weighing conditions, i.e. for example, who the driver of the machine is and what timber grade is being loaded at the time. In addition, the weighing system preferably takes into account whether changes have occurred since the previous weighing in the machine being used for loading, i.e. in the lifting boom or grapple and what kind of timber is being loaded. For example, in loading energy timber the shape of the bundle being loaded can be very different to that when loading logs. It is then possible to use, as the initial correction factor of the loading, the most recent correction factor, calculated on the basis of the loadings made by the operator in question with the timber and goods grades and recorded in the weighing system. When conditions change, the calculation of the correction factor can always be started either from an initial correction factor, or from the most recent correction factor of the previous weighing.

Though the loading mass is very quickly made accurate by means of the method according to the invention, the reliability of the loading weighing can be checked by using an as such known test weight as the bundle. The test weight can be, for example, a three-metre long steel pipe, which has been cast full of concrete or other material to achieve the desired mass. As such the size and mass of the test weight is of little significance, as long as the mass is known precisely and it can be assumed to be distributed evenly inside the test weight. The check weighing is then carried out only statically, so that the loader weigher is brought theoretically to the correct measurement range and, for example, errors due to device faults can be detected. Precision greater than the precision required of the weighing system is preferably used and the check weighing is also made when the test weight is tilting. A tilt is achieved by gripping the test weight eccentrically, in such a way that the test weight settles in a slanting attitude with one end of the test weight lower than the other. In other words, the suspension bracket's upper and lower pins permit the tilting of the bundle to an attitude corresponding to a state of equilibrium. In static check weighing, an accuracy of, for example, ±2% is demanded. From time to time, for example, once a week, the values of the check weighing made are recorded and exploited in the method according to the invention.

Using the weighing system according to the invention, the saving in time over check weighing according to the prior art is easily more than two hours a week, if previously the check weight was used once a day and check weighing took about half an hour. At the same time, the accuracy of the loader weigher when loading improves substantially.

Using the weighing system according to the invention several different factors causing errors can be eliminated by comparing the differences between the loading and unloading of an individual load. Errors arise in the loading stage, in which there is often considerable variation relative to different variables. The load unloading stage, however, is often very constant and identical between different loads, so that the accuracy of unloading remains good. Generally, the accuracy required of unloading-direction weighing is in the order of ±4%.

Technically, the weighing system is able to determine the unloading direction without action by the operator, as sensor means monitoring the rotation angle are installed in the loader weigher, for example, in the loader or when installed in a loader or crane, for example in its rotation device. Thus, the sensing of the loader weigher notifies the weighing system of the rotation angle at any time. On the other hand, the movements of the loader can be monitored sufficiently accurately for the purpose also without separate sensoring, if the operations of the loader are monitored, particularly the control of its rotation device during working.

The arrangement according to the invention can also be used to monitor the operation of forwarders. The computation unit can record the total masses of all the individual loads in its memory, to that they can be examined later. This permits, for example, overloads to be monitored also afterwards, if the forwarder develops a fault.

In this connection, the material-handling machine according to the invention can be any device whatever suitable for applying the idea of the invention, which can be used to weigh bundles both in loading and unloading. The material-handling machine can be, for example, a scrapyard crane or similar.

The invention claimed is:

1. A method in a weighing system of a crane, the weighing system having a weight sensor, computation unit and a memory, the method comprising:
    a loading step at a loading site, said loading step comprising:
        lifting a bundle from a plurality of bundles with the crane equipped with the weighing system into a load space, wherein the plurality of bundles form a load in the load space;
        weighing, with the weight sensor, and recording, with the computation unit to the memory, a mass of each bundle used to form the load;
        correcting, via the computation unit, the mass of each bundle weighed during loading in the memory using an initial correction factor;
        calculating, with the computation unit, a total loading mass of the load by summing the corrected masses of the plurality of bundles weighed during loading;
        moving the load from the loading site to a remote unloading site;
    an unloading step at the unloading site, said unloading step comprising:
        unloading the plurality of bundles of the load with the crane from the load space;
        weighing, with the weight sensor, and recording, with the computation unit to the memory, a mass of each bundle during unloading of the bundles of the load;
        calculating, with the computation unit, a total unloading mass of the load by summing the masses of a plurality of bundles of the load weighed during unloading;
    calculating, with the computation unit, a new correction factor ($C_{j+1}$) based on a reference value determined through use of the total loading mass and the total unloading mass of the load according to the following equation:

$$C_{j+1} = \frac{C_j}{1 - B \times F}$$

wherein $C_j$ represents the initial correction factor, B represents the reference value, and F represents a filtering coefficient; and
   repeating the lifting, weighing and calculating steps above with the new correction factor for a subsequent load.

2. The method of claim 1, further comprising calculating a product of the mass of each bundle weighed during loading and the correction factor in order to give the corrected mass of the bundle.

3. The method of claim 1, wherein the reference value is calculated according to the following equation;

$$B = \frac{m_{P\_kok\_j} - m_{K\_kok\_j}}{m_{P\_kok\_j}}$$

wherein $m_{P\_kok\_j}$ represents the total unloading mass and $m_{K\_kok\_j}$ represents the total loading mass.

4. The method of claim 1, further comprising adjusting the weighing of loading for each load.

5. The method according to claim 1, further comprising adjusting the mass of each individual loading bundle with the aid of the correction factor.

6. The method according to claim 1, further comprising using the corrected correction factor, calculated with the aid of the load, to adjust the weighing of a subsequent load.

7. The method according to claim 1, wherein the filtering coefficient is based on adaptive filtering that adjusts the parameters on the basis of external information in the calculation of the correction factor.

8. The method of claim 1, wherein the filtering coefficient is a fixed percentage between about 50% and about 90%.

9. The method of claim 1, wherein the filtering coefficient is a fixed percentage between about 65% and about 75%.

10. The method of claim 1, where the filtering coefficient is based on a sliding mean value.

11. The method according to claim 1, further comprising calculating the correction factor condition-sensitively.

12. The method of claim 1, further comprising using a neutral initial correction factor to calculate the correction factor for loading of the load.

13. A software product comprising instructions stored on a non-transitory computer readable medium that perform the method of claim 1.

14. The method of claim 1, further comprising measuring acceleration relative to one or more axes using one or more acceleration sensors to obtain acceleration, where the step of calculating the corrected loading mass further includes correcting the recorded mass of a plurality of bundles weighed during loading in the memory using the correction factor and the acceleration data.

* * * * *